United States Patent
Sainct et al.

(10) Patent No.: US 11,050,950 B2
(45) Date of Patent: Jun. 29, 2021

(54) METHOD FOR OBSERVING A REGION OF THE EARTH'S SURFACE, NOTABLY LOCATED AT HIGH LATITUDES; GROUND STATION AND SATELLITE SYSTEM FOR IMPLEMENTING THIS METHOD

(71) Applicant: THALES, Courbevoie (FR)

(72) Inventors: Hervé Sainct, Cannes la Bocca (FR); Vincent Soulignac, Cannes la Bocca (FR)

(73) Assignee: THALES, Courbevoie (FR)

( * ) Notice: Subject to any disclaimer, the term of this patent is extended or adjusted under 35 U.S.C. 154(b) by 533 days.

(21) Appl. No.: 14/790,843

(22) Filed: Jul. 2, 2015

(65) Prior Publication Data
US 2016/0006950 A1  Jan. 7, 2016

(30) Foreign Application Priority Data

Jul. 4, 2014 (FR) ..................... 14 01509

(51) Int. Cl.
*H04B 7/185* (2006.01)
*H04N 5/28* (2006.01)
(Continued)

(52) U.S. Cl.
CPC ............. *H04N 5/28* (2013.01); *B64G 1/1021* (2013.01); *B64G 1/1085* (2013.01); *B64G 1/242* (2013.01);
(Continued)

(58) Field of Classification Search
CPC .... B64G 1/1021; B64G 1/1085; B64G 1/242; B64G 2001/1028; H04N 5/23238;
(Continued)

(56) References Cited

U.S. PATENT DOCUMENTS 6,157,621 A * 12/2000 Brown ................... H01Q 1/242
370/310
6,333,924 B1 * 12/2001 Porcelli .................. H04B 7/195
342/356
(Continued)

FOREIGN PATENT DOCUMENTS

AU  WO2003040653 A1 *  5/2003 ............. G01C 11/02
WO  2012/040828 A1     4/2012

OTHER PUBLICATIONS

Alexander P. Trishchenko et al., "Spatial and Temporal Sampling of Polar Regions from Two-Satellite System on Molniya Orbit," Journal of Atmospheric and Oceanic Technology, vol. 28, No. 8, Aug. 2011, pp. 977-992, XP055190639.
(Continued)

*Primary Examiner* — Patrick E Demosky
(74) *Attorney, Agent, or Firm* — BakerHostetler

(57) ABSTRACT

A method for observing a region of the Earth's surface, called region of interest, implementing a plurality of satellites spaced apart along at least one non-stationary orbit, the method comprises: the acquisition, by at least two of the satellites, during a same passage over the region of interest and in successive acquisition periods, of a plurality of images of the Earth's surface, called partial images, each covering a portion of the region of interest; and the obtaining of an image covering all of the region of interest by the merging of at least two partial images, exhibiting a predefined time shift between their acquisition periods, for each of the at least two satellites. A satellite system for observing a region of the Earth's surface for the implementation of such a method, and ground segment belonging to such a system is provided.

9 Claims, 6 Drawing Sheets

(51) Int. Cl.
  *B64G 1/24* (2006.01)
  *B64G 1/10* (2006.01)
  *H04N 5/232* (2006.01)

(52) U.S. Cl.
  CPC ..... *H04N 5/23232* (2013.01); *H04N 5/23238* (2013.01)

(58) Field of Classification Search
  CPC ........ H04N 5/23232; H04N 7/18; H04N 5/28; G06T 3/4061; G06T 2207/10032; G01C 11/02
  See application file for complete search history.

(56) References Cited

U.S. PATENT DOCUMENTS

| | | | | |
|---|---|---|---|---|
| 6,766,987 B2* | 7/2004 | Taormina | ............... | H04B 7/195 244/158.4 |
| 6,795,687 B1* | 9/2004 | Castiel | ................ | B64G 1/1007 342/356 |
| 7,840,180 B2* | 11/2010 | Rosen | ..................... | H04N 7/20 455/12.1 |
| 2009/0224105 A1* | 9/2009 | Caplin | .................... | B64G 1/26 244/158.4 |
| 2010/0013927 A1* | 1/2010 | Nixon | .................... | G01C 11/06 348/144 |
| 2012/0188372 A1* | 7/2012 | Ozkul | ................. | B64G 1/1021 348/144 |
| 2013/0250104 A1* | 9/2013 | Williams | .............. | G06T 3/4061 348/144 |
| 2013/0278757 A1* | 10/2013 | Martin | ..................... | B64G 3/00 348/135 |
| 2014/0168434 A1* | 6/2014 | Gerlach | ................ | H04N 7/183 348/144 |
| 2015/0353205 A1* | 12/2015 | Nixon | .................... | B64D 47/08 348/144 |

OTHER PUBLICATIONS

Alexander P. Trishchenko et al., "Observing polar regions from space: advantages of a satellite system on a highly elliptical orbit versus a constellation of low Earth polar orbiters," Canadian Journal of Remote Sensing, vol. 38, No. 1, Jan. 13, 2012, pp. 12-24, XP055190644.

* cited by examiner

METHOD FOR OBSERVING A REGION OF THE EARTH'S SURFACE, NOTABLY LOCATED AT HIGH LATITUDES; GROUND STATION AND SATELLITE SYSTEM FOR IMPLEMENTING THIS METHOD

CROSS-REFERENCE TO RELATED APPLICATIONS

This application claims priority to foreign French patent application No. FR 1401509, filed on Jul. 4, 2014.

FIELD OF THE INVENTION

The invention relates to a method for observing a region of the Earth's surface by means of a plurality of satellites sharing a same orbit, and to a ground segment and to a satellite system for implementing such a method.

The invention applies in particular to the observation of regions of the Earth's surface situated at a high latitude (greater than or equal to 60° north or south) by means of satellites situated on highly elliptical orbits (HEO) that are also inclined. These orbits are characterized by a perigee of low altitude (typically of the order of 500-1000 km), an apogee of high altitude (typically greater than 35,786 km, the altitude of the geostationary satellites) and a high inclination (typically greater than 50° and more often lying between 50° and 90°). The invention is not however limited to the case of the inclined HEO orbits; it can also be applied to the case of observation satellites moving on orbits of other types, for example Tundra orbits.

BACKGROUND

Most observation satellite services are operated either from geostationary platforms, or from non-stationary low orbits. The first guarantee a very wide coverage (approximately a third of the globe) and a permanency of observation (rapid rate of image capture, making it possible for example to measure cloud movements), whereas the second allow for better spatial resolutions to the detriment of permanency (non-stationary orbits with a periodicity of hourly type do not make it possible, for example, to measure rapid atmospheric changes).

The geostationary orbits have hitherto been prioritised for applications such as the adjustment of weather forecasting models, and have given rise to the development of dedicated series of satellites such as "Meteosat" and "Goes", from which the regularly repeated images allow for numerous estimations, notably the calculation of wind velocities (AMV, "atmospheric motion vectors"), a prime and an essential product of climate forecasting.

There are however areas of the earth, at high latitudes, for which the positioning of a satellite in geostationary orbit—necessarily located above the equator—does not make it possible to obtain correct images because of the significant angle of inclination from which these regions are observed.

For this reason, many northern countries are ill-served by the geostationary satellite systems currently deployed, and consider particular projects, on better suited orbits. These will typically be orbits of strongly inclined HEO type, and whose apogee, very much higher than the perigee, is located in the same hemisphere as the country that has to be served. The inclination of the orbit makes it possible to observe the regions situated at high latitudes from a fairly low angle of inclination; the high altitude of the apogee, relative to that of the perigee, ensures that the satellite spends most of its orbital period over the region of interest (for example 8 hours that can be used for observation out of an orbit of 12 hour period). Examples that can be mentioned include the TAP (Three-apogee, that is to say orbit with three apogees per day) orbits and Molnyia orbits. FIG. 1 provides a comparison of an HEO orbit with the low orbits (LEO, low earth orbit), medium orbits (MEO, medium earth orbit) and geostationary orbits (GEO).

In as much as these orbits are not geostationary, the permanent observation from a single satellite is impossible, which leads to the deployment of two or more satellites on inclined orbits that may or may not be similar, offset in such a way that when one of the satellites looses the visibility of the region of interest (typically on returning to its perigee), another is present to take over.

One consequence of the use of HEO orbits is that, contrary to the geostationary observation systems, in which an image of the region of interest is taken entirely by a same satellite, the systems suited to high latitudes conventionally envisage regularly sharing the coverage of the region of interest between two satellites, with a part of said region of interest covered by a first "partial image" acquired by one of the satellites, while the other part of said region of interest is covered by a second "partial image" acquired almost simultaneously by the next satellite. In such a case, a correct overlap between the two parts of images is necessary, which creates a constraint on the locating of the satellites and their orbit.

Numerous systems of this type have been envisaged, such as, for example, the Canadian PCW system which considers, among other things, pairs of satellites on TAP orbits, making it possible to obtain regular images of all of the region of interest.

These orbits are well suited, geometrically, to observation missions. However, they exhibit certain significant drawbacks:

Firstly, the placing in station of a satellite on an HEO orbit has a high energy cost and one that is all the greater when the inclination and/or the altitude of the perigee are high. This limits the weight of the satellites that can be embedded on a launch vehicle and/or increases the launch cost.

Secondly, the low altitude of the perigee—required to increase the time spent at the apogee, useful for the observation—provokes the regular circulation of the satellite in or close to Van Allen belts, where the radiation environment is extremely aggressive: this severely limits the life of the embedded electronics, and/or imposes heavy shielding work which subsequently increases the satellite launch cost.

It would therefore be desirable to use less inclined and/or less elliptical orbits, but this would unacceptably degrade the observation (excessively oblique observation and/or gaps in coverage of the region of interest at the join between the partial images).

SUMMARY OF THE INVENTION

The invention aims to overcome the abovementioned drawbacks of the prior art. More particularly, it aims to make it possible to relax the constraints on the HEO orbits of the satellites used for the observation of regions on the Earth's surface located at high latitudes, without in any way compromising a complete and continuous observation.

As an example, making it possible to appreciate the importance of a reduction of inclination of the HEO orbits, an orbit can be considered that has a perigee at 200 km and an apogee at 42,000 km. For such an orbit, the manuals of the launch vehicles make it possible to bear out that a reduction of inclination of from 64.9° to 51.8°, all other parameters being equal, would make it possible to almost double the launchable weight.

The aim of the invention is achieved by exploiting an increase in the rate of image capture—made possible by the technological advances in the onboard imaging apparatuses—to allow for a relaxing of the constraint due to the overlap between partial images and therefore allow the use of orbits that are less costly in terms of inclination and/or less penalising in terms of radioactive doses.

One object of the invention making it possible to achieve this aim is a method for observing a region of the Earth's surface, called region of interest, implementing a plurality of satellites moving along at least one non-stationary orbit, said method comprising:

the acquisition, by at least two of said satellites, during a same passage over said region of interest and in successive acquisition periods, of a plurality of images of the Earth's surface, called partial images, each covering a portion of said region of interest; and the obtaining of an image covering all of said region of interest by the merging of at least two said partial images, exhibiting a predefined time shift between their acquisition periods, for each of said at least two satellites.

According to different embodiments of such a method:

Partial images, called images of the same rank, can be acquired at the same time by said satellites; the number of said satellites, said or each said non-stationary orbit and said acquisition periods being chosen such that partial images of the same rank, taken in combination, ensure a partial coverage of said region of interest, exhibiting coverage gaps.

Said partial images can be obtained by scanning and, upon the acquisition of a first set of partial images of the same rank, said scanning commences in proximity to said coverage gaps, whereas, upon the subsequent acquisition of a second set of partial images of the same rank, said scanning ends in proximity to said coverage gaps.

Each said partial image can be obtained by scanning a respective observation region, determined such that it does not extend beyond said region of interest.

The method can implement exactly two satellites.

Said satellites can be spaced apart along a same non-stationary orbit.

Said image covering all of said region of interest can be obtained by merging exactly two said partial images for each of said satellites, acquired in successive acquisition periods.

Said region of interest can be in the form of a spherical cap.

Said or each said non-stationary orbit can be an inclined highly elliptical orbit—of HEO type—and said region of interest can consist of a portion of the Earth's surface exhibiting a latitude greater than or equal to a limit value L, with L≥50° and preferably L≥60°.

The method can also comprise an operation of assignment, to each pixel of each said partial image, of a set of information representative of an acquisition instant and of a point of the Earth's surface corresponding to said pixel, said set of information being used in the merging of said partial images.

Another object of the invention is a ground segment comprising:

at least one satellite receiver configured to receive, from at least two satellites spaced apart along a same non-stationary orbit, signals representative of images of the Earth's surface, called partial images, each covering a portion of a same region, called of interest, and acquired in successive acquisition periods during a same passage of said satellites over said region of interest; and a data processor configured to merge at least two said partial images for each of said at least two satellites, said partial images received from each said satellite exhibiting a predefined time shift between their acquisition periods, in order to obtain an image covering all of said region of interest.

Yet another object of the invention is a satellite system for observing a region of the Earth's surface, called region of interest, comprising:

a space segment comprising a plurality of satellites moving along at least one non-stationary orbit, configured to acquire, during a same passage over said region of interest and in successive acquisition periods, a plurality of images of the Earth's surface, called partial images, each covering a portion of said region of interest, and to transmit said partial images to a ground segment; and a ground segment as mentioned above.

According to an advantageous embodiment of such a system, said or each said non-stationary orbit can be a highly elliptical orbit—of HEO type—and said region of interest can consist of all the points of the Earth's surface exhibiting a latitude greater than or equal to a limit value L≥50° and preferably L≥60°.

BRIEF DESCRIPTION OF THE DRAWINGS

Other features, details and advantages of the invention will emerge on reading the description given with reference to the attached drawings given by way of example in which.

DETAILED DESCRIPTION

Figure 1:
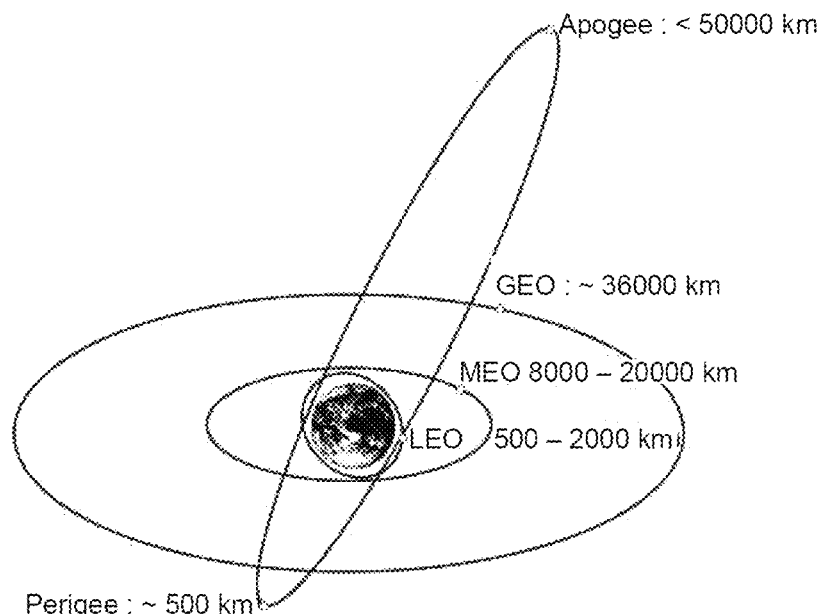
FIG. 1 illustrates LEO, MEO, GEO and HEO orbits.
Figure 2:
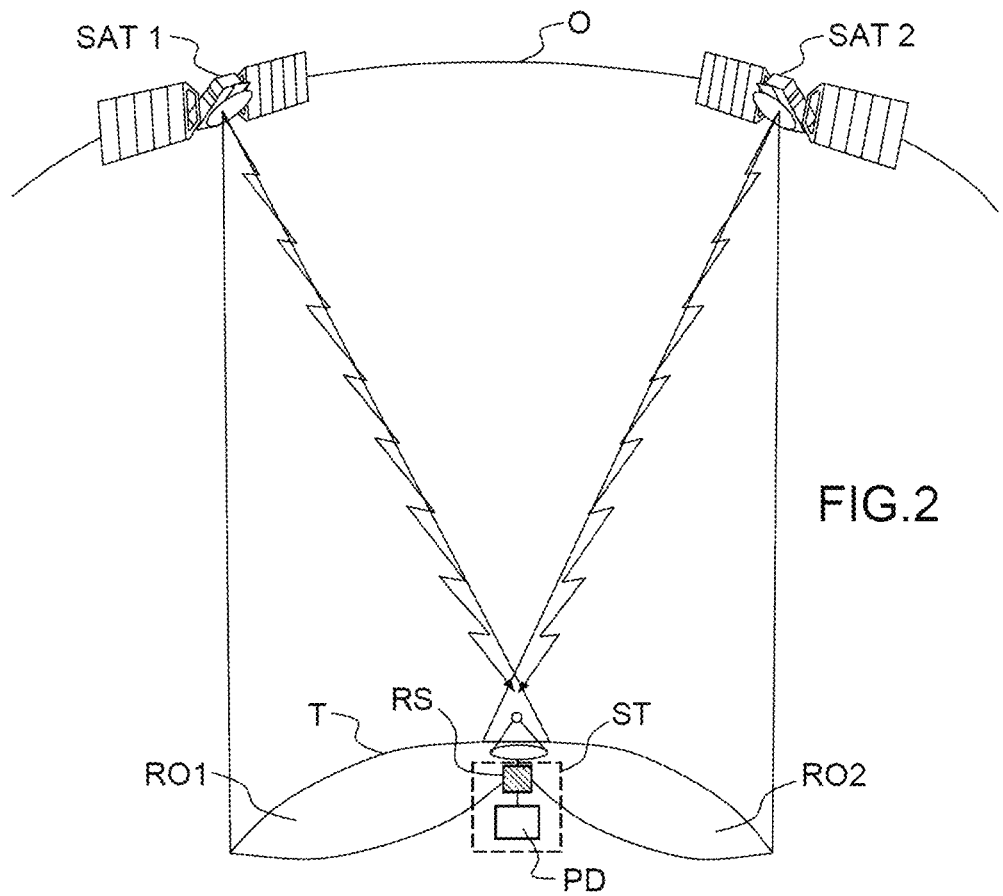
FIG. 2 represents, in a simplified manner, a satellite system for observing a region of the Earth's surface by means of a plurality of satellites on an HEO orbit suitable for implementing the invention.

FIG. 2 highly schematically illustrates a satellite system for observing a region of the Earth's surface suitable for the implementation of the invention. Conventionally, the system comprises a space segment and a ground segment.

The space segment comprises at least two observation satellites SAT1, SAT2 moving along a same orbit O of HEO type. Given that the orbit is elliptical, the speed of the satellites varies greatly between the apogee (minimum speed) and the perigee (maximum speed); consequently, their spacing is also variable in time. In the case where the number of satellites is equal to two, their spacing corresponds to a half-orbital period, such that when the satellite SAT1 is close to the apogee, the other satellite SAT2 is located close to the perigee, and vice versa.

The satellites each bear an observation instrument, generally with scanning (not represented), making it possible to obtain an image of a portion of the Earth's surface. "Observation region" describes the portion of the Earth's surface observed by each said satellite at a given instant (since the orbit O is non-stationary, the observation regions move with the satellites). In the figure, the references RO1 and RO2 indicate the observation regions of the two satellites SAT1 and SAT2. The satellites are also equipped with a transmitter enabling them to transmit signals representative of the acquired images towards the Earth T.

The ground segment comprises at least one earth station or ground station ST equipped with a satellite receiver RS to receive the signals transmitted by the satellites SAT1, SAT2, and a data processor PD (computer or set of computers) making it possible to process these signals to reconstruct the images of a region of interest of the Earth's surface. As a variant, the satellite receiver or receivers and the data processor need not be collocated.

The system can comprise more than two satellites—for example three—and more than one ground station (it is common practice to use two or more thereof to increase the acquisition time of each satellite). The satellites constituting the space segment of the system are generally identical, but this is not essential. Furthermore, they do not necessarily share a same orbit: more generally, it is possible to consider that each satellite moves on a specific HEO orbit, these orbits (or some of them) being able possibly to coincide.

It should be stressed that FIG. 2 is not to scale. In particular, it greatly underestimates the altitude of the orbit O and the distance between the satellites.

As will be explained in detail hereinbelow, an observation satellite system according to the invention is differentiated from a system according to the prior art (for example, of the abovementioned PCW type) essentially by:

the choice of the orbit O, which can be less inclined and/or less elliptical;

the configuration of the acquisition instruments borne by the satellites (rate of acquisition of the images, scanning, etc); and the processing of the data implemented by the data processor PD.

Figure 3:
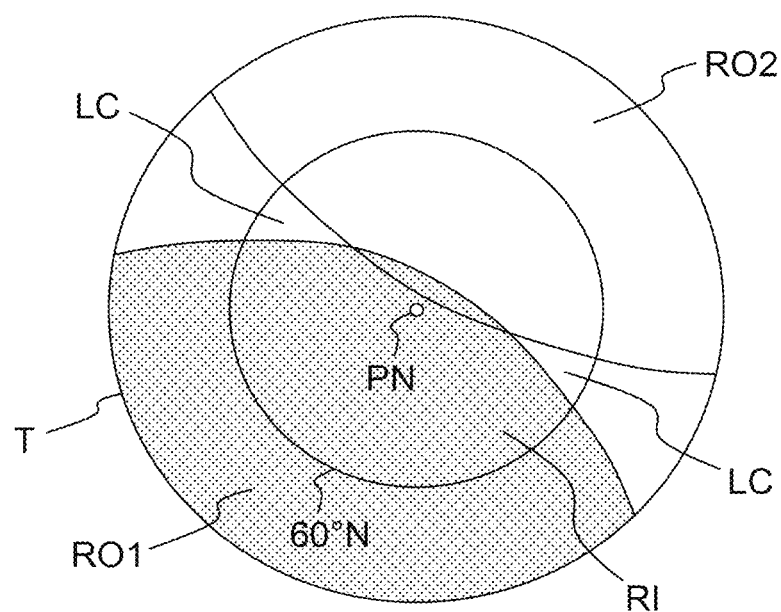
FIG. 3 illustrates a partial coverage, including gaps, of a region of interest at high latitudes obtained by the merging of two partial images acquired by two satellites staggered along a same HEO orbit.

FIG. 3 shows the Earth T seen by its north pole PN, with a region of interest RI in the form of a spherical cap comprising all the points of latitude greater than or equal to 60° north. The figure reveals the observation regions at a given instant of the two satellites SAT1, SAT2 constituting the space segment of an observation system according to the invention: RO1 and RO2. It should be noted that, when the satellite SAT1 is close to the apogee, its observation region covers all the region of interest, whereas the satellite SAT2 is located close to the perigee and overflies the southern hemisphere. There is then an intermediate period, in which SAT1 moves away from the apogee whereas SAT2 approaches thereto; during this period, the two satellites each have a partial visibility of the region of interest. Finally, a configuration is reached in which the region of interest is observed only by the satellite SAT2. The figure relates to the intermediate period, and more specifically to an instant when the two observation regions RO1 (satellite SAT1) and RO2 (SAT2) cover almost equivalent portions of the region of interest RI, the region RO1 being in the process of gradually shrinking to the benefit of RO2. It will be noted that the observation regions "overflow" from the region of interest RI and partially overlap, but above all that, because of an insufficiently suitable orbit O (excessively small inclination and/or excessively low apogee), they leave two coverage gaps remaining, identified by the reference LC; these gaps move in time, and disappear when the region of interest is entirely observed by a single satellite. The specifications of an observation system of the type of FIG. 2 demand, normally, that images covering all of the region of interest be supplied at regular intervals, for example every 30 minutes. The presence of the coverage gaps LC prevents this objective from being reached, and is therefore unacceptable.

According to the prior art, it is possible to "close" the gaps by increasing the inclination of the orbit O of the satellites SAT1, SAT2 and/or the altitude of its apogee, even by providing an additional satellite but, as is explained above, these solutions are costly to implement.

By contrast, the invention proposes relaxing the constraints on the orbit O, and "closing" the coverage gaps which result therefrom by increasing the rate of acquisition of the images, which is made possible by the advances in imaging instruments, and by exploiting the rotation of the Earth between two successive or close together image acquisitions.

According to the invention, the satellites SAT1 and SAT2 are used to acquire a first pair of partial images, corresponding to the observation regions RO1, RO2, during a first acquisition period of a duration equal, for example, to 10 min (partial images "of first rank"). Then, these same satellites are used to acquire a second pair of partial images ("of second rank") during a second acquisition period approximately of the same duration. Between the two acquisition periods, the Earth has turned about its axis and the two satellites have advanced along their orbit; consequently, the coverage gaps have moved relative to the Earth's surface. Thus, four partial images are available which, taken in combination, cover all of the region of interest and whose measurements are contemporaneous to within 20 minutes, even though the total overlap of the region of interest is not possible from a single pair of partial images acquired from the orbit O.

In some cases, the coverage can be ensured by three, instead of four, partial images. Thus, when a first satellite moves away from the apogee while a second satellite appears on the horizon of the region of interest, an image acquired only by the first satellite is combined with two partial images acquired just after by both satellites. Later, two partial images are combined with an image acquired only by the second satellite after the first has disappeared on the horizon.

It will moreover be noted that, when one of the satellites is located close to the apogee, it can acquire just one image of the region of interest without needing to combine partial images.

It should be noted that, even in the case of a "conventional" acquisition, the date stamping of the pixels is not the same over the entire image, because the partial images are acquired by scanning, which takes time. Moreover, in a product of L1C type there is no need for all the pixels to be simultaneous, only for each of them to be dated and associated with a point of the Earth's surface.

Specifically, for the implementation of the invention, it will be possible to proceed as follows:

First of all, it is necessary to determine the maximum acceptable time interval between two complete images, and it must be checked that this interval makes it possible to acquire two partial images. Thus, the timing of the two pairs (or more) of acquisitions of partial images is determined.

Then, the constraints of the orbit O are gradually relaxed, by reducing its inclination and/or by lowering its apogee, while checking by simulation that the combination of two (or more) pairs of acquisitions still makes it possible to reconstruct complete images of the region of interest at the requisite rate.

For example, two satellites spaced apart by a half-period on a polar orbit (inclined by 90° relative to the equatorial plane) with perigee at 29,500 km and apogee at 54,800 km make it possible to cover all the region of the Earth's surface of latitude greater than or equal to 60° N with a rate of one image every 10 minutes. This can be verified in FIG. 4, where RO1 is the region observed by the satellite SAT1 6 hours after its passage at the apogee and RO2 the region observed by the satellite SAT2 at the same moment, that is to say 6 hours after its passage at the perigee (for brevity, this instant will be called "apogee +6 h"). The figure also makes it possible to check that the ring between 50° N and 60° N of latitude is not observed correctly because of two coverage gaps LC.

Figure 5A:
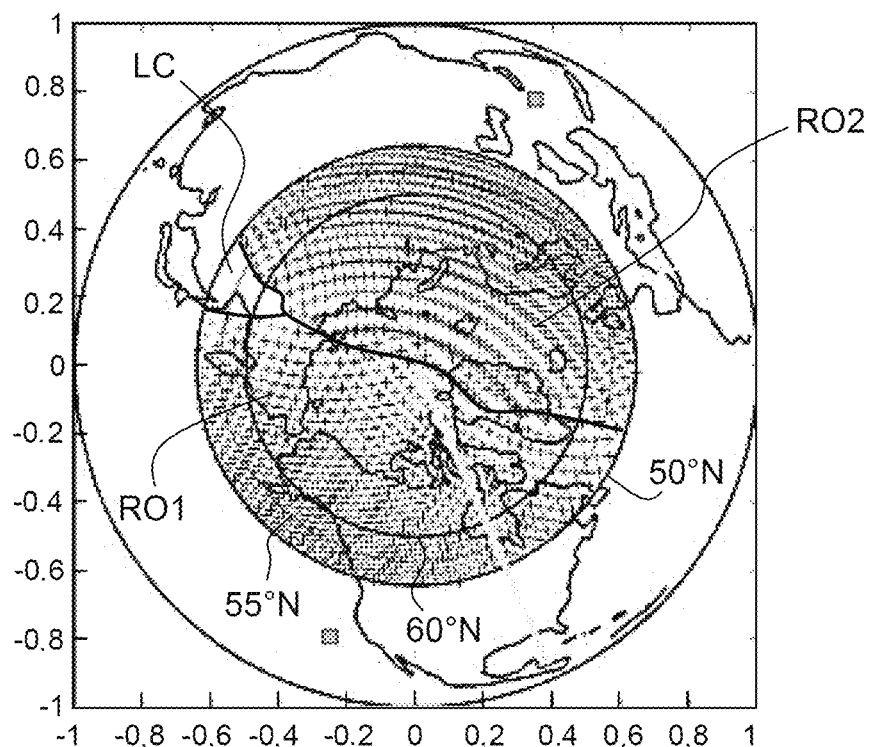
FIGS. 5a to 5c illustrate a first embodiment of the invention.
Figure 5B:
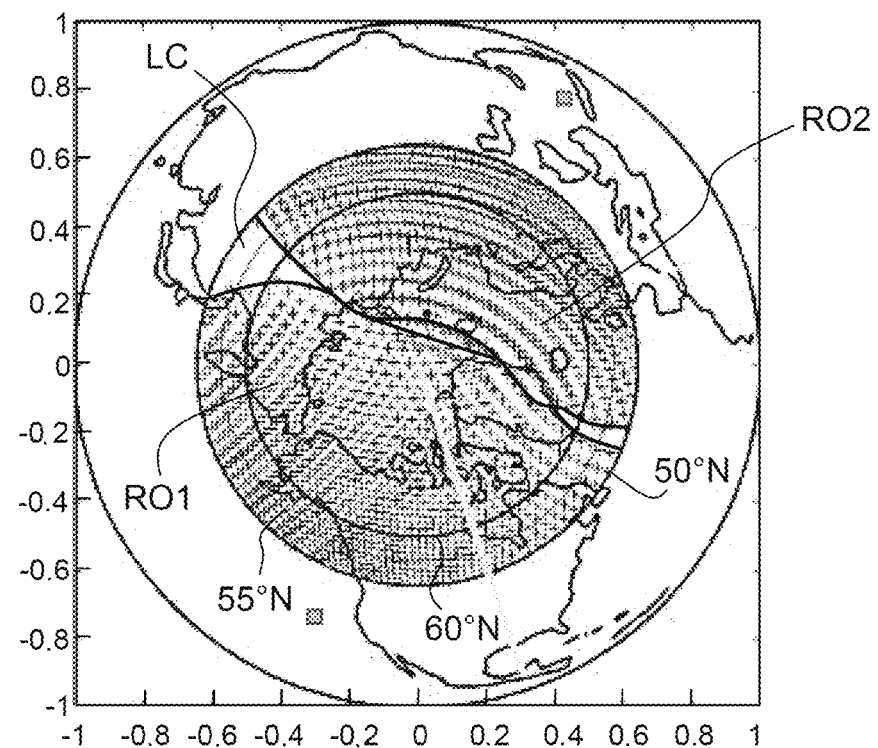

If the inclination is reduced to 85°, while leaving all the other parameters unchanged, the coverage gaps extend into the region beyond 60° N of latitude, which is not acceptable. This can be observed in FIG. 5*a*, corresponding to the instant "apogee +6 h", like in FIG. 5*b*, corresponding to the instant "apogee +6.333 h", that is to say 20 minutes later. However, if the two images are combined (FIG. 5*c*), a complete coverage beyond 60° N is once again obtained.

Figure 6A:
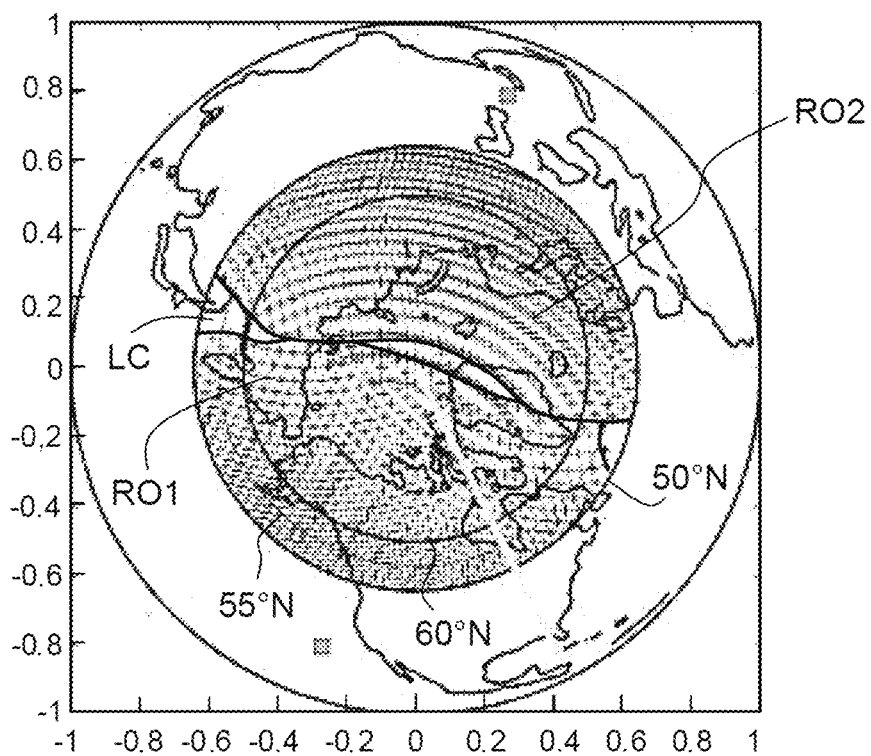
FIGS. 6a to 6d illustrate a second embodiment of the invention.
Figure 6B:
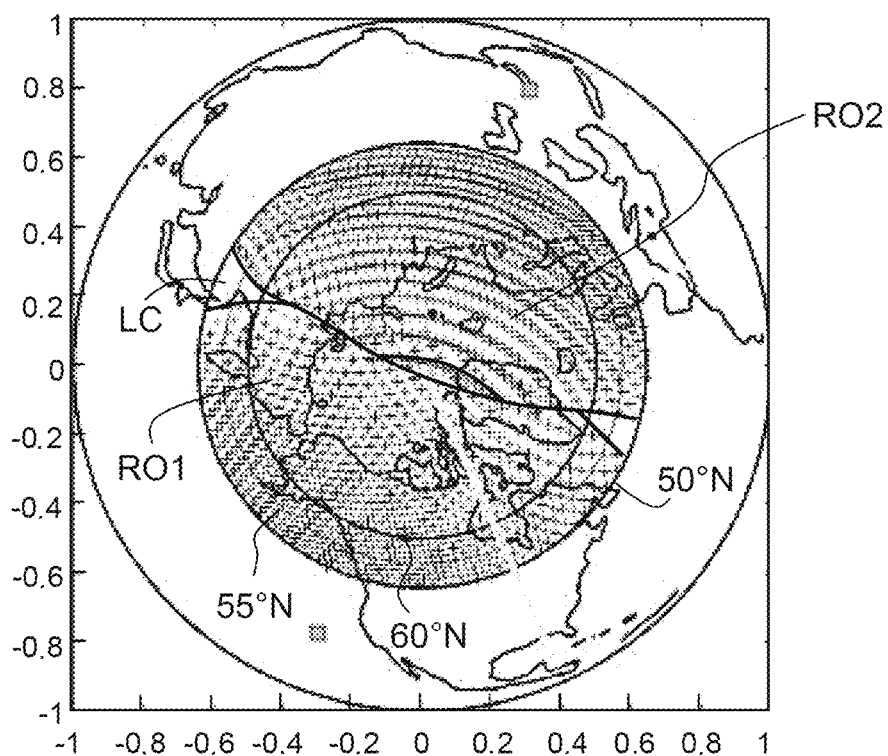
Figure 6C:
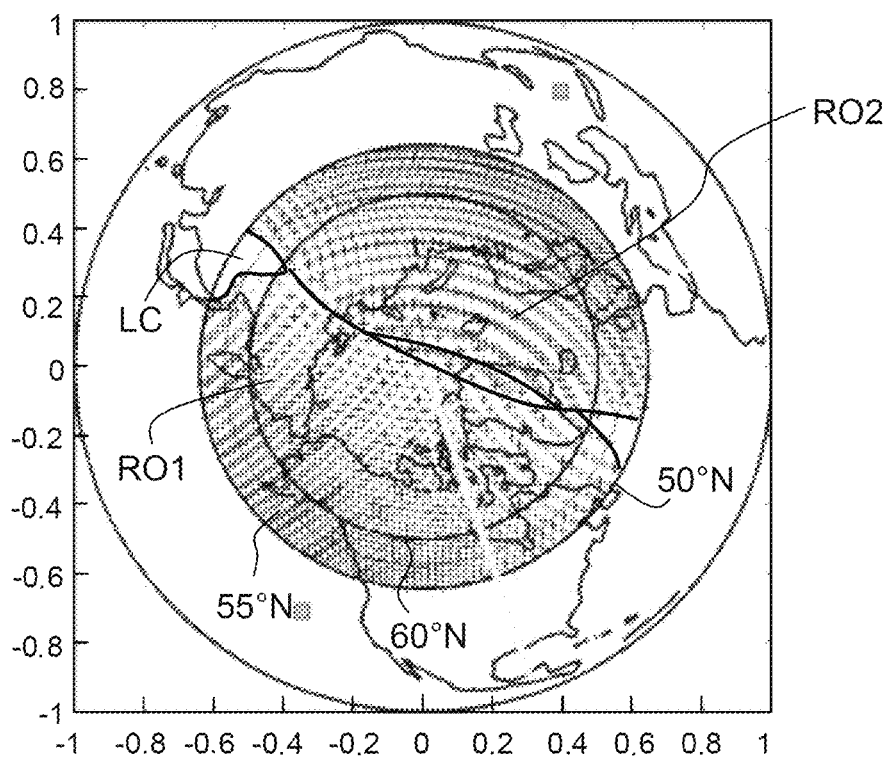
Figure 6D:
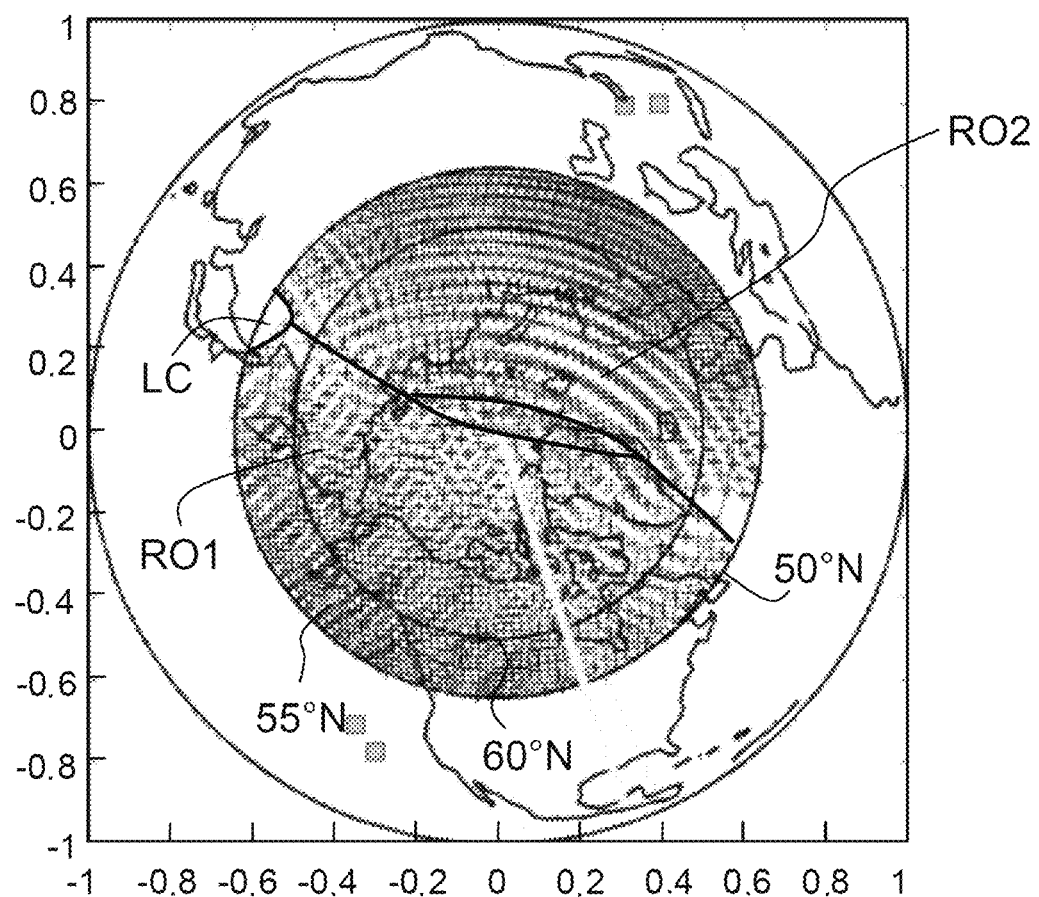

Conversely, the combination of images acquired at different instants makes it possible to extend the coverage to lower latitudes for a given inclination of the orbit of the satellites. FIGS. 6*a*, 6*b* (substantially identical to FIG. 4) and 6*c* correspond, respectively, to an orbit inclination of 90° and to the instants "apogee +5.83333 h", "apogee +6 h" and "apogee +5.3333 h"; FIG. 6*d* corresponds to a combination of these images, taken over a time interval of 30 minutes, which is again acceptable. It is possible to check that the composite image allows for a complete coverage to a latitude of 55° (dotted line circle). This example is interesting because it shows a case where more than two pairs of individual images or "sub-images" (three, in the case in point), have to be combined.

Figure 4:
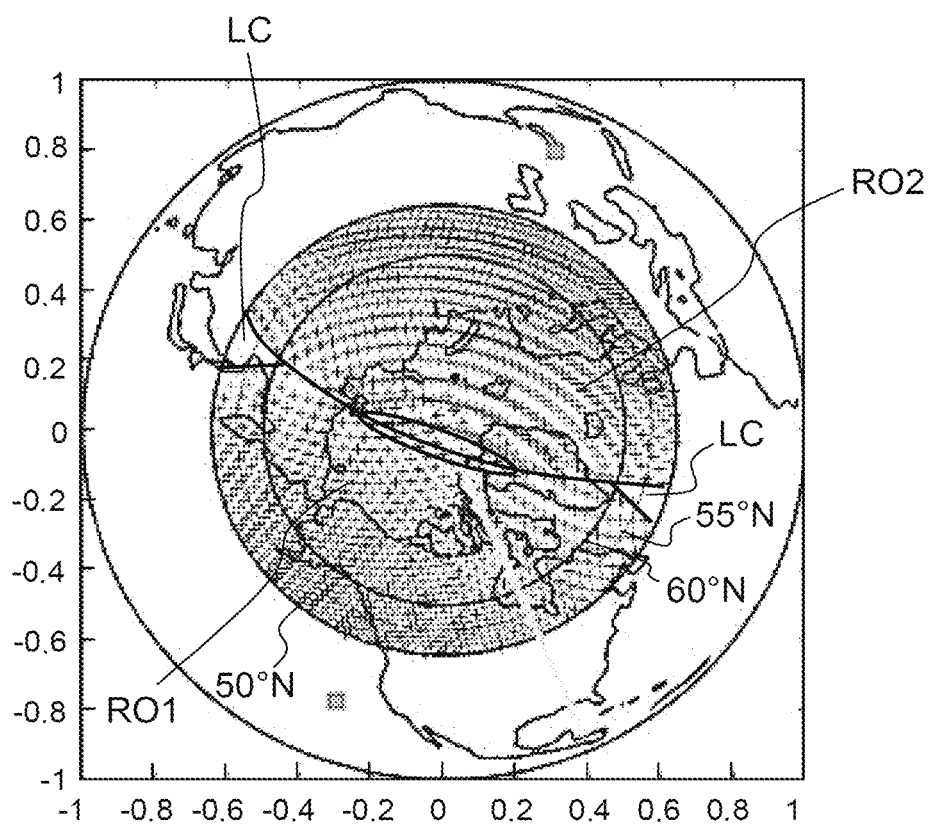
FIG. 4 illustrates the coverage obtained, in a conventional manner, by two satellites staggered along a same polar HEO orbit.
Figure 5C:
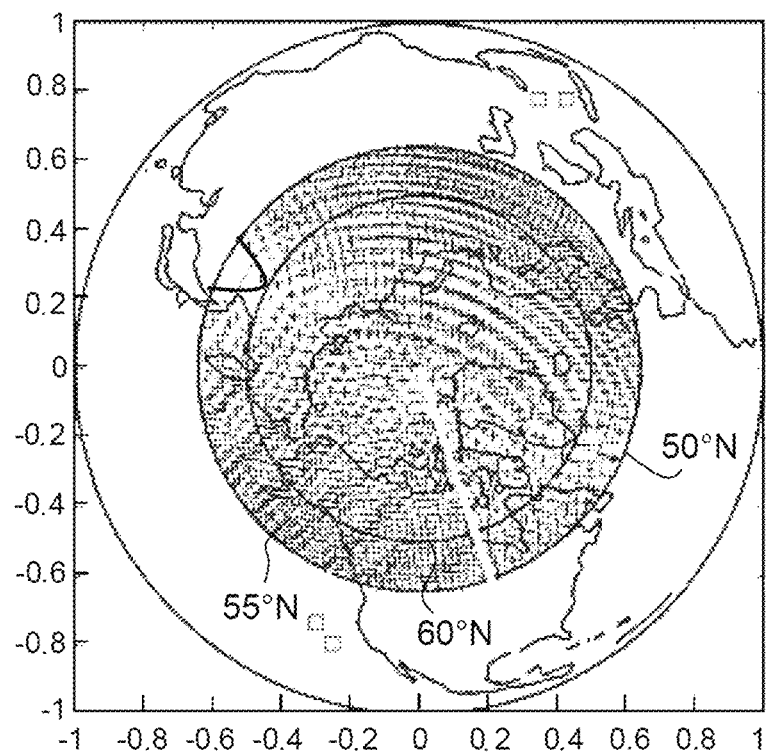

FIGS. 4 to 5*c* make it possible to check that, after the acquisition of two pairs of sub-images:

most of the points of the region of interest are covered by two pixels, because seen twice by the same satellite or once by each satellite;

some of these points are covered by three or four pixels, because seen simultaneously by the two satellites in one acquisition, even two;

and some others by a single pixel, because situated correlated with a coverage gap for the first or the second acquisition, this gap being filled by the other acquisition.

In a conventional strategy, taking a single partial image per satellite, these points would not have been covered.

After the double acquisition, the four partial images must be merged to arrive at a final image where each point is covered by a single pixel. For those of the points of the area of interest which are covered by two images or more, any conventional strategy for reconstructing the final pixel from all of the original pixels by combination, extrapolation, resampling, etc., is feasible. In accordance with the invention, the Earth's rotation that has occurred between the first and the last acquisition has moved the coverage gaps; consequently, the points of the region of interest which are initially located correlated with one of these gaps are now covered by one (and only one) pixel acquired in the second acquisition, and, conversely, the points located correlated with a coverage gap in the second acquisition are covered by a pixel obtained via the first acquisition. For these points, it is sufficient to retain the one pixel which corresponds to them, from all the available acquisitions (before, if appropriate, performing a resampling of the image, which is conventional).

These comments can be generalized to the cases where more than two pairs of sub-images are combined, such as, for example, in the embodiment of FIGS. 6*a*-6*d*.

In a particularly simple embodiment of the invention, two satellites are used that are provided with identical imagers, which acquire partial images in a manner that is also identical. In this embodiment, each satellite acquires—generally by scanning—an image of all of the portion of the Earth's surface which is accessible to it at a given moment, even if it extends beyond the region of interest, after which the "excess" pixels (those outside the region of interest RI) are simply eliminated. This method is not optimal, because time has to be pointlessly spent in acquiring pixels outside of the region of interest. It is therefore more advantageous to use two satellites that are identical but exhibit image acquisition laws that are different and variable over time as a function of the position of the satellites, such that each satellite acquires only pixels inside the region of interest. Such a programming is complex, but perfectly deterministic and predictable, and can therefore be defined once and for all as a function of the position of the satellite on its orbit, therefore simply as a function of time.

An example of such programming consists, from the total area accessible at a given moment by a satellite, in subtracting therefrom the part outside of the region of interest, and in redefining the image acquisition law of the instrument (for example, by scanning) so that, at the end of the image acquisition, only the region of interest is acquired. Consider, for example, an acquisition law by scanning successive lines, in which each line would be interrupted as soon as it encounters the boundary of the region of interest, making it possible, without going further, to immediately restart the next line within the region ("programming constrained by the useful surface"). In the case of an imaging instrument whose operation would however entail regular sightings of the space beyond the edge of Earth for the purposes, for example, of calibrating the detectors, it will be possible to extend the scanning up to and beyond the edges of Earth for this purpose, at only the instants when the calibration becomes essential. In the general case of two or more satellites located in any positions on their orbits, the periods of acquisition of the areas devolved to each are potentially different. The programming constrained by the useful surface can also be applied if the two satellites are not identical.

Another example of programming constraint, which can be aggregated with the above, consists in defining the observation regions, and the course of the scanning in the case of an acquisition by scanning, in such a way that all the pixels obtained are as uniform as possible on the temporal plane. In other words, it involves choosing, from all the possible scannings covering all of the region of interest, the one that gives a final image in which the difference between the dates of acquisition of any two pixels is minimal. This can be obtained notably by assigning each satellite a portion of the region of interest to be covered such that the time taken by each satellite to obtain the image of this portion is identical or close to that taken by the other satellite for the other portion. Another criterion, alternative or complementary, can consist in choosing, when a point of the region of interest is seen by two satellites, the pixel acquired by the satellite whose projection on the ground (sub-satellite point) is closest to said point of the region of interest. This choice makes it possible to minimize the scanning time while prioritising the exposure quality (all the better when the observed point is close to the sub-satellite point).

Any other criterion that makes it possible to subdivide a target area into two parts of identical or close acquisition times remains valid in this approach.

Moreover, it may be advantageous to choose the scannings implemented by each satellite in such a way that the acquisition of the first pair of partial images begins in proximity to the coverage gaps, and the acquisition of the second (or last) pair of partial images ends in proximity to said gaps. The effect of this is that, between the start of the first image (acquisition close to the gap) and the end of the second image (acquisition again close to the gap), the longest possible time has elapsed. This is advantageous because the rotation of the Earth between the start of the first imaging and the end of the second will have induced a greater movement of the coverage gaps relative to the Earth's surface, making it possible to fill the larger gaps, and therefore further relax the constraints on the orbit of the satellites.

Hitherto, only the case of a system with two satellites in which each final image is constructed from two or three pairs of partial images has been considered, but that is not an essential limitation. In effect, the space segment of the observation system can comprise any number—strictly greater than one—of satellites. For example, it is possible to consider the case of a system with three satellites of which only two at most observe the region of interest at any instant. It is also possible to consider a system in which, at certain instants, three or more satellites share the observation of the region of interest. Furthermore, it is possible to consider variants of the method of the invention in which more than three partial images per satellite are acquired.

A variant makes it possible also to insert "zooms" on a critical region (for example during a dangerous local meteorological episode) within the normal cycle; more generally, it is possible to conceive a "usual" image acquisition plan which comprises margins designed to allow such "zooms" in case of dangerous meteorological episodes (or any other critical event to be observed rapidly).

The region of interest does not necessarily have to be in the form of a spherical cap, nor does it have to be limited to the circumpolar regions, although that is a preferred embodiment of the invention; it can for example be defined by the territories and territorial waters of a country or of a given group of countries. Furthermore, it is not essential for the satellites to move along one or more inclined orbits. On the contrary, the invention can also be implemented by means of satellites moving in an orbit situated substantially in an equatorial plane. It could, for example, concern two (or more) microsatellites launched as passengers in a firing into geostationary transfer orbit with a period of 12 hours.

The invention claimed is:

1. A method for observing a region of the Earth's surface, called region of interest, using exactly two satellites spaced apart along a same non-stationary orbit with a spacing corresponding to a half-orbital period, said method comprising:
    acquiring, by said two satellites, during a same passage over said region of interest and in successive acquisition periods, a plurality of images of the Earth's surface, called partial images, each covering a portion of said region of interest; and
    obtaining an image covering all of said region of interest by the merging of exactly two said partial images for each of said satellites, acquired in successive acquisition periods, exhibiting a predefined time shift between the acquisition periods of said partial images, for each of said two satellites,
    wherein the partial images include images of a same rank that are acquired at the same time by said two satellites,
    wherein said non-stationary orbit and said acquisition periods being chosen such that the partial images of the same rank, taken in combination, ensure a partial coverage of said region of interest, exhibiting coverage gaps, and
    wherein said non-stationary orbit is an inclined highly elliptical orbit and said region of interest consists of a portion of the Earth's surface exhibiting a latitude greater than or equal to a limit value $L \geq 50°$.

2. The method of claim 1 wherein said partial images are obtained by scanning and, upon acquisition of a first set of partial images of the same rank, said scanning begins in proximity to said coverage gaps, whereas, upon subsequent acquisition of a second set of partial images of the same rank, said scanning ends in proximity to said coverage gaps.

3. The method of claim 1 wherein each said partial image is obtained by scanning a respective observation region, determined such that it does not extend beyond said region of interest.

4. The method of claim 1 said region of interest is in the form of a spherical cap.

5. The method of claim 1, further comprising an operation of assignment, to each pixel of each said partial image, of a set of information representative of an acquisition instant and of a point of the Earth's surface corresponding to said pixel, and wherein said set of information is used in the merging of said partial images.

6. A ground segment comprising:
    at least one satellite receiver configured to receive, from exactly two satellites spaced apart along a same non-stationary orbit with a spacing corresponding to a half-orbital period, signals representative of images of the Earth's surface, called partial images, each covering a portion of a same region of interest, and acquired in successive acquisition periods during a same passage of said satellites over said region of interest; and
    a data processor configured to merge exactly two said partial images for each of said two satellites, acquired in successive acquisition periods, said partial images received from each said satellite exhibiting a predefined time shift between the acquisition periods of said partial images, in order to obtain an image covering all of said region of interest,
    wherein the partial images include images of a same rank that are acquired at the same time by said two satellites,
    wherein said or each said non-stationary orbit and said acquisition periods being chosen such that the partial images of the same rank, taken in combination, ensure a partial coverage of said region of interest, exhibiting coverage gaps, and
    wherein said non-stationary orbit is an inclined highly elliptical orbit and said region of interest consists of a portion of the Earth's surface exhibiting a latitude greater than or equal to a limit value $L \geq 50°$.

7. A satellite system for observing a region of the Earth's surface, called region of interest, comprising:
    a space segment comprising a plurality of satellites moving along at least one non-stationary orbit with a spacing corresponding to a half-orbital period, configured to acquire, during a same passage over said region of interest and in successive acquisition periods, a plurality of images of the Earth's surface, called partial images, each covering a portion of said region of interest, and to transmit said partial images to a ground segment; and a ground segment comprising: at least one satellite receiver configured to receive, from exactly two satellites spaced apart along a same non-stationary orbit, signals representative of images of the Earth's surface, called partial images, each covering a portion of a same region of interest, and acquired in successive acquisition periods during a same passage of said satellites over said region of interest; and a data processor configured to merge exactly two said partial images for each of said two satellites, said partial images received from each said satellite exhibiting a predefined time shift between the acquisition periods of said partial images, in order to obtain an image covering all of said region of interest, wherein the partial images include images of a same rank that are acquired at the same time by said two satellites, wherein said or each said non-stationary orbit and said acquisition periods being chosen such that the partial images of the same rank, taken in combination, ensure a partial coverage of said region of interest that exhibits coverage gaps, and wherein said non-stationary orbit is an inclined highly elliptical orbit and said region of interest consists of a portion of the Earth's surface exhibiting a latitude greater than or equal to a limit value $L \geq 50°$.

8. The method of claim 1 wherein said or each said non-stationary orbit is an inclined highly elliptical orbit and said region of interest consists of a portion of the Earth's surface exhibiting a latitude greater than or equal to a limit value $L \geq 60°$.

9. The satellite system of claim 7 wherein said or each said non-stationary orbit is a highly elliptical orbit and said region of interest consists of all the points of the Earth's surface exhibiting a latitude greater than or equal to a limit value $L \geq 60°$.

* * * * *